United States Patent [19]
Tsai

[11] Patent Number: 5,895,914
[45] Date of Patent: Apr. 20, 1999

[54] SCANNER CAPABLE OF SCANNING PENETRATIVE DOCUMENT AND REFLECTIVE DOCUMENT WITH SINGLE LAMP

[75] Inventor: Jenn-Tsair Tsai, Hsinchu, Taiwan

[73] Assignee: Musktek Systems Inc., Hsinchu, Taiwan

[21] Appl. No.: 08/805,073

[22] Filed: Feb. 25, 1997

[51] Int. Cl.[6] ...................................... H04N 1/04

[52] U.S. Cl. ................................ 250/234; 358/474

[58] Field of Search ........................ 250/234, 235, 250/236; 358/474, 475, 487, 488, 494, 497

[56] References Cited

U.S. PATENT DOCUMENTS

| | | | |
|---|---|---|---|
| 5,140,443 | 8/1992 | Iwahara et al. | 358/474 |
| 5,574,274 | 11/1996 | Rubley et al. | 250/234 |
| 5,691,824 | 11/1997 | Haded et al. | 358/474 |

*Primary Examiner*—Edward P. Westin
*Assistant Examiner*—Kevin Pyo
*Attorney, Agent, or Firm*—Rosenberg, Klein & Bilker

[57] ABSTRACT

A scanner including a scanning unit for scanning penetrative document as well as reflective document, and a light source projecting unit adapted for reflecting light from the light source of the scanning unit through penetrative document when the light source of the scanning unit is turned from the position for reflective scanning mode to the position for penetrative scanning mode.

5 Claims, 3 Drawing Sheets

SCANNER CAPABLE OF SCANNING PENETRATIVE DOCUMENT AND REFLECTIVE DOCUMENT WITH SINGLE LAMP

BACKGROUND OF THE INVENTION

The present invention relates to scanners, and more particularly to such a scanner which is practical for scanning penetrative document as well as reflective document.

FIG. 1 shows a scanner adapted for scanning reflective document as well as penetrative document. The scanner comprises a scanning unit 80, and a light source projecting unit 90. The scanning unit 80 comprises a carriage 82 mounted on a conveying belt 83 and moved relative to document by a motor M through a gear train G and belt wheels P, a lamp holder 81 mounted on the carriage 82 and holding a lamp L1, a reflecting mirror assembly and a focusing lens respectively mounted on the carriage 82, and an image sensor for example a charge coupled device CCD for converting light from the focusing lens into a corresponding image signal. The light source projecting unit 90 comprises a conveying belt 92 mounted on belt wheels P turned by a motor M through a gear train G2, a lamp holder 91 mounted on the conveying belt 92 and holding a lamp L2. The light source projecting unit 90 is operated when the scanner is set for penetrative scanning mode for scanning penetrative document. When the scanner is set for reflective scanning mode for scanning reflective document, the light source projecting unit 90 is turned off. Because the scanning unit 80 and the light source projecting unit 90 are provided with a respective light source, much warm up time is needed when alternatively changing the scanning mode. More particularly when cathode ray tubes are used for the light sources of the scanning unit and the light source projecting unit, much warm up time is wasted. Furthermore, the installation of the two light sources greatly increase the manufacturing cost of the scanner. In order to let heat be quickly carried away from the light source of the light source projecting unit, a relatively larger housing is required.

SUMMARY OF THE INVENTION

The present invention has been accomplished to provide a scanner which eliminates the aforesaid drawbacks. It is one object of the present invention to provide a scanner which is practical for scanning penetrative document as well as reflective document. It is another object of the present invention to provide a scanner which uses only one light source for scanning penetrative document as well as reflective document. According to one embodiment of the present invention, the scanner comprises a scanning unit adapted for scanning reflective document, and a light source projecting unit controlled to match with the scanning unit for scanning penetrative document. The scanning unit has a light source that can be turned between an upward position for reflective scanning mode and a horizontal position for penetrative scanning mode, and a reflecting mirror adapted for reflecting light from the light source onto the light source projecting unit. The light source projecting unit is comprised of a set of reflecting mirrors adapted for reflecting light from the light source of the scanning unit onto the image sensor thereof through penetrative document.

DETAILED DESCRIPTION OF THE PREFERRED EMBODIMENT

Figure 1:
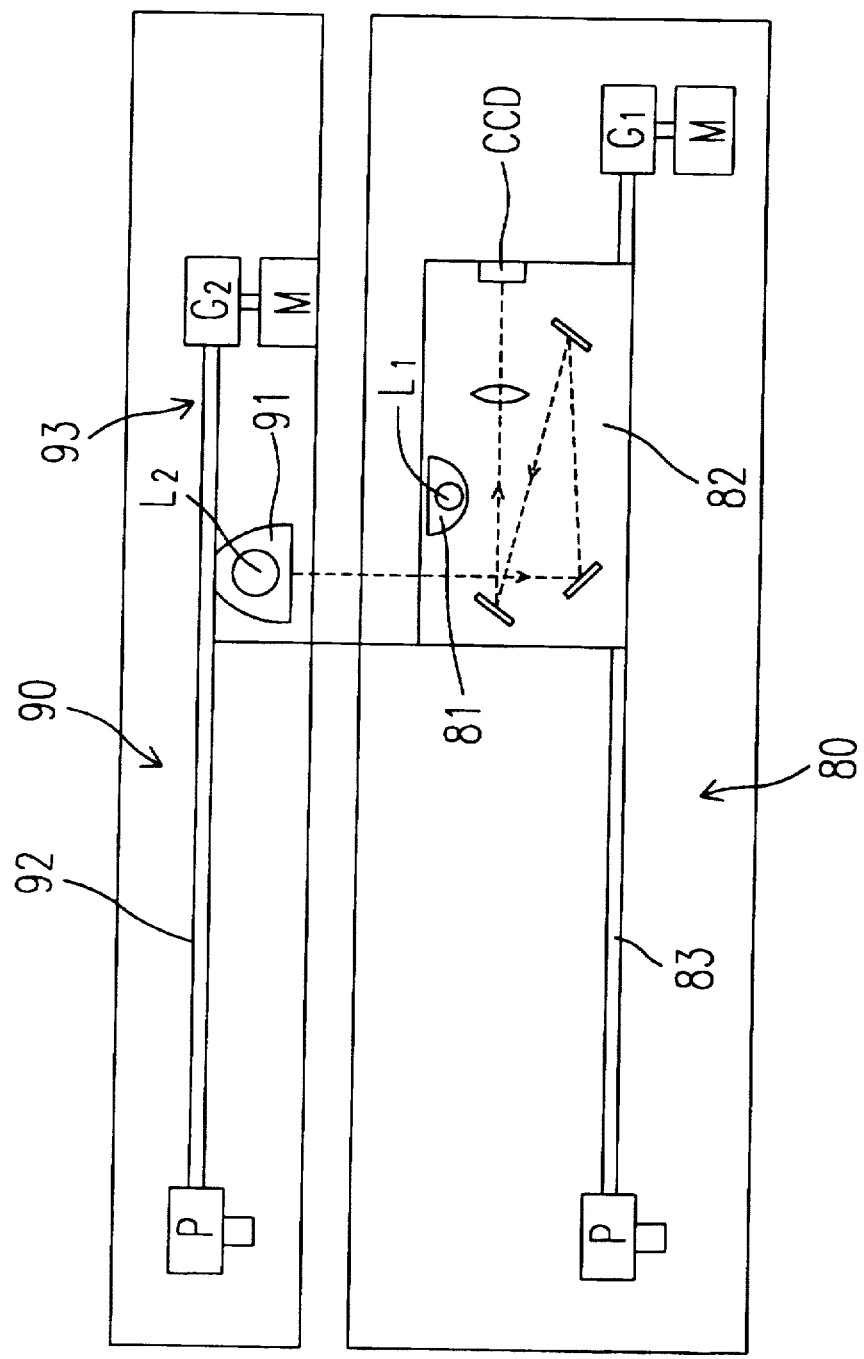
FIG. 1 is a plain view of a scanner according to the prior art.
Figure 2:
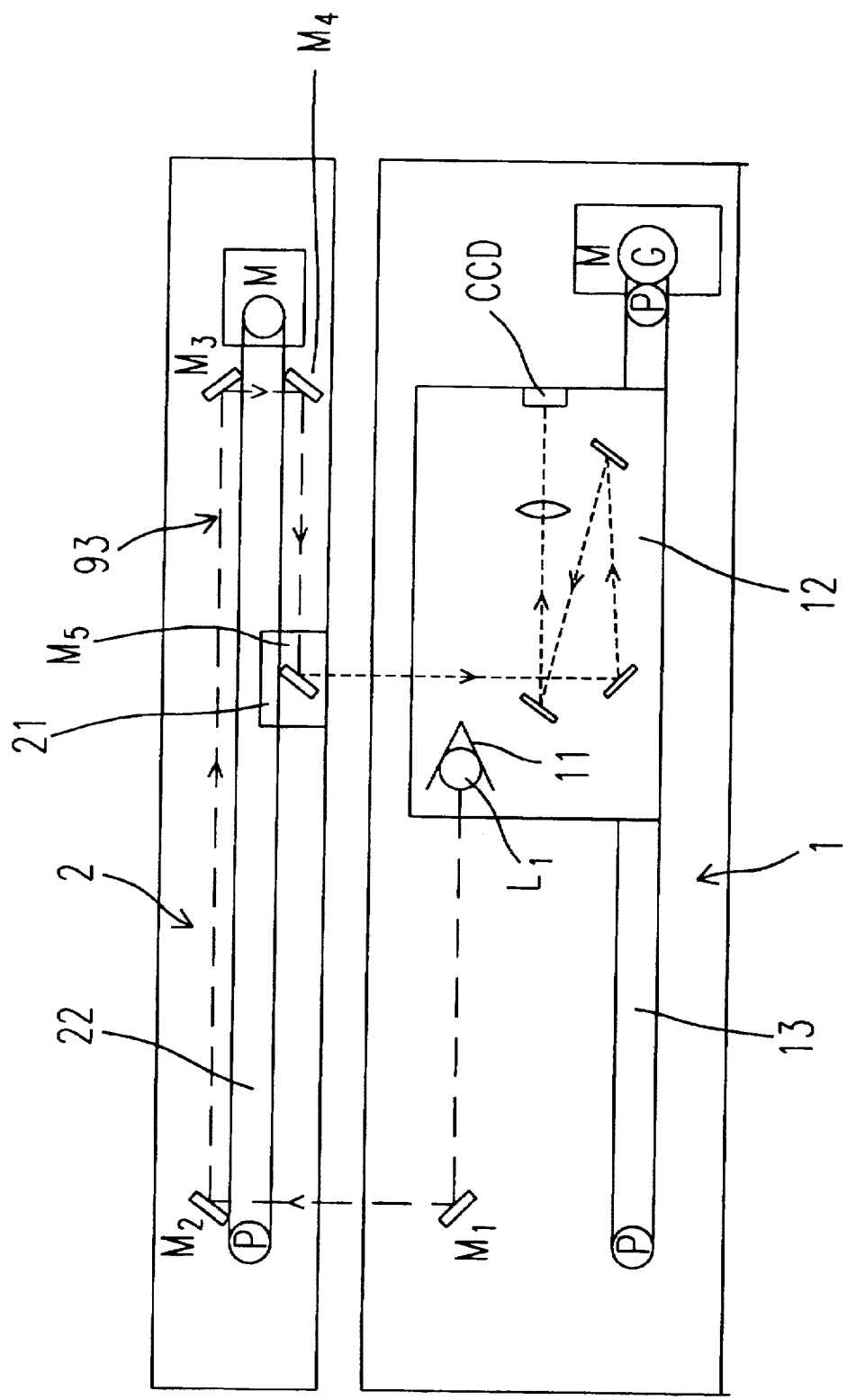
FIG. 2 is a plain view of a scanner according to the present invention when set for reflective scanning mode.
Figure 3:
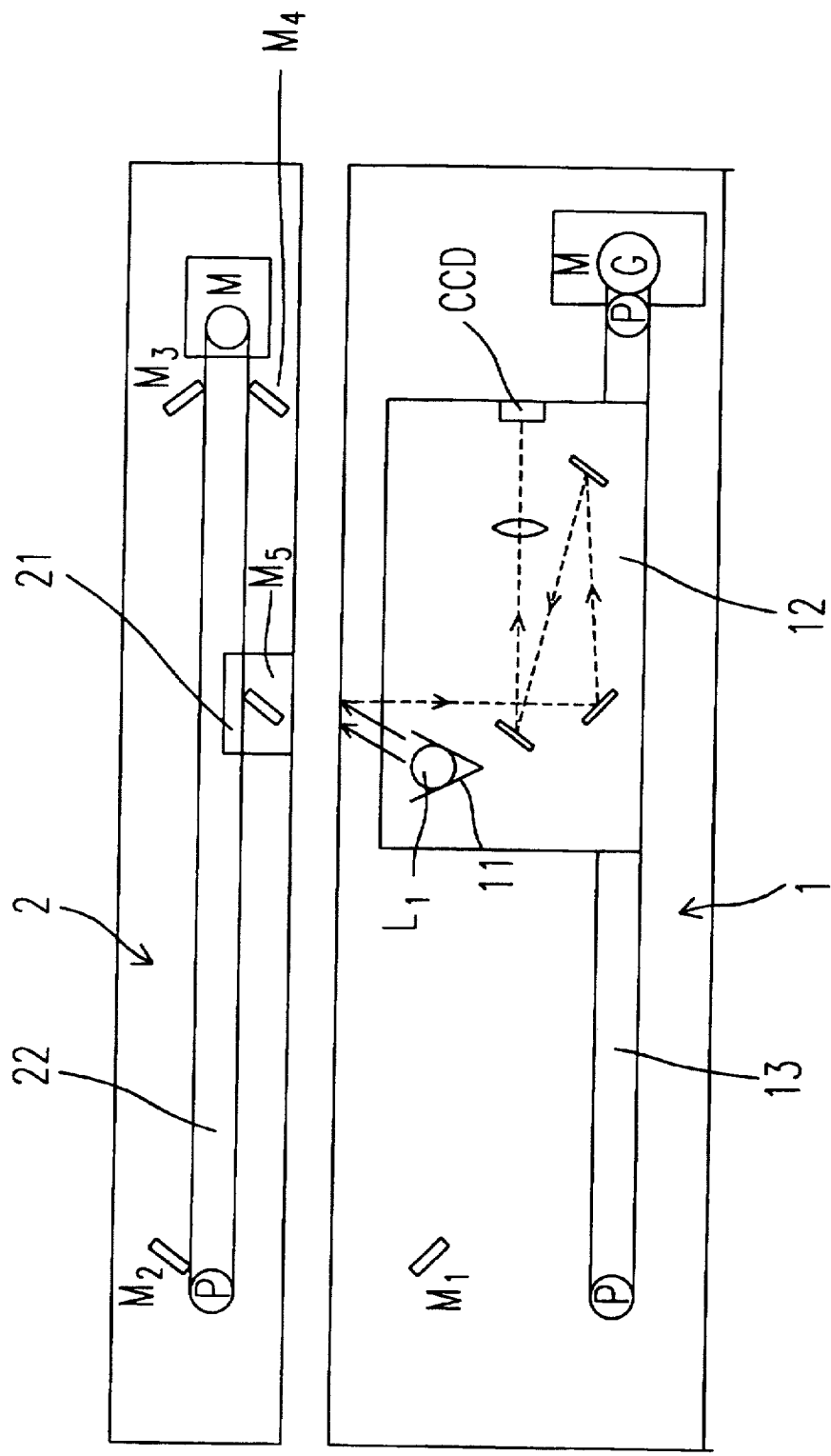
FIG. 3 is similar to FIG. 2 but showing the lamp holder set for penetrative scanning mode.

Referring to FIGS. 2 and 3, a scanner in accordance with the present invention comprises a scanning unit 1, and a light source projecting unit 2.

The scanning unit 1 comprises a motor drive which is comprised of a motor M, a gear train G coupled to the motor M, a set of belt wheels P, and a conveying belt 13 mounted on belt wheels P and turned by the motor M through the gear train G and the belt wheels P, a carriage 12 moved linearly between two opposite positions, a lamp holder 11 mounted on the carriage 12 and holding a lamp L1 and turned between a first position for a penetrative scanning mode (see FIG. 2) and a second position for a reflective scanning mode (see FIG. 3), a reflecting mirror M1 adapted for reflecting light from the lamp L1 onto the light source projecting unit 2 when the lamp holder 11 is turned to the first position for the penetrative scanning mode, and a charge coupled device CCD adapted for converting light reflected from the light source projecting unit 2 into a corresponding image signal (the scanning unit 1 further comprises reflecting mirrors and at least one focusing lens by which reflected light from the light source projecting unit 2 can be focused onto the charge coupled device CCD.

The light source projecting unit 2 comprises a carriage 21, a conveying belt 22 driven by a motor M and belt wheels P to move the carriage 21, movable reflecting mirror M5 fixedly mounted on the carriage 21 and moved with it, a plurality of fixed reflecting mirrors M2; M3; M4 adapted for reflecting light from the reflecting mirror M1 of the scanning unit 1 onto the movable reflecting mirror M5, permitting reflected light from the light source projecting unit 2 to be constantly focused onto the charge coupled device CCD.

As indicated above, the present invention provides a scanner having a scanning unit and a light source projecting unit that can be set for a penetrative scanning mode and a reflective scanning mode alternatively.

While only one embodiment of the present invention has been shown and described, it will be understood that various modifications and changes could be made thereunto without departing from the spirit and scope of the invention disclosed.

What the invention claimed is:

1. A scanner comprising:

a scanning unit having a light source and an image sensor for scanning a document, said light source including a lamp holder and a lamp mounted in said lamp holder, said scanning unit including a reflecting mirror for reflecting light onto a light source projecting unit; and, said light source projecting unit disposed corresponding to said scanning unit, said light source projecting unit being adapted for reflecting light from said reflecting mirror of said scanning unit through a penetrative document, and permitting the image of the penetrative document to be focused onto said image sensor;

wherein said light source projecting unit includes a movable reflecting mirror synchronously moved with said light source of said scanning unit for maintaining said reflected light substantially focused on said image sensor.

2. The scanner of claim 1 wherein said light source projecting unit comprises at least one reflecting mirror.

3. The scanner of claim 1 wherein said lamp holder can be turned between a first position for penetrative scanning mode, and a second position for reflective scanning mode.

4. The scanner as recited in claim 3 wherein said lamp of said lamp holder projects light upward when said lamp holder is turned to said first position for a penetrative scanning mode of operation.

5. The scanner as recited in claim 3 wherein said lamp holder is turned to said second position for a reflective scanning mode of operation.

\* \* \* \* \*